US009721019B2

(12) United States Patent
Kyaw et al.

(10) Patent No.: US 9,721,019 B2
(45) Date of Patent: Aug. 1, 2017

(54) SYSTEMS AND METHODS FOR PROVIDING PERSONALIZED RECOMMENDATIONS FOR ELECTRONIC CONTENT

(71) Applicants: Thu Kyaw, Reston, VA (US); Sang Chul Song, Aldie, VA (US); Sean Christopher Timm, Herndon, VA (US); Sudhir Achuthan, Vienna, VA (US); Mikhail Barrett, Fairfax, VA (US); Vineet Mahajan, Ashburn, VA (US)

(72) Inventors: Thu Kyaw, Reston, VA (US); Sang Chul Song, Aldie, VA (US); Sean Christopher Timm, Herndon, VA (US); Sudhir Achuthan, Vienna, VA (US); Mikhail Barrett, Fairfax, VA (US); Vineet Mahajan, Ashburn, VA (US)

(73) Assignee: AOL Inc., Dulles, VA (US)

( * ) Notice: Subject to any disclaimer, the term of this patent is extended or adjusted under 35 U.S.C. 154(b) by 220 days.

(21) Appl. No.: 13/710,293

(22) Filed: Dec. 10, 2012

(65) Prior Publication Data

US 2014/0164401 A1 Jun. 12, 2014

(51) Int. Cl.
*G06F 17/30* (2006.01)

(52) U.S. Cl.
CPC .. *G06F 17/30867* (2013.01); *G06F 17/30345* (2013.01)

(58) Field of Classification Search
None
See application file for complete search history.

(56) References Cited

U.S. PATENT DOCUMENTS

| 8,091,032 | B2 * | 1/2012 | Fischer | 715/751 |
| 2001/0003185 | A1 * | 6/2001 | Lee | G06F 17/30256 |
| 2007/0028266 | A1 * | 2/2007 | Trajkovic et al. | 725/46 |
| 2009/0006398 | A1 * | 1/2009 | Lam et al. | 707/7 |
| 2009/0210475 | A1 * | 8/2009 | Gadanho et al. | 709/201 |
| 2009/0234876 | A1 * | 9/2009 | Schigel et al. | 707/102 |

(Continued)

OTHER PUBLICATIONS

International Search Report, issued for International Application No. PCT/US2013/073250, mailed on Aug. 25, 2014 (2 pages).

*Primary Examiner* — Richard Bowen
(74) *Attorney, Agent, or Firm* — Finnegan, Henderson, Farabow, Garrett & Dunner, LLP

(57) ABSTRACT

Computer-implemented systems and methods are provided for presenting content recommendations. In one implementation, a method is provided for providing content recommendations to a plurality of users. The method may include generating a first plurality of content recommendations for a first user using a first plurality of methods, each of the first plurality of methods having a weight associated therewith. The method may further include selecting a second plurality of content recommendations from the first plurality of content recommendations based on the weights associated with the first plurality of methods. The method may further include providing the second plurality of content recommendations to the first user. The method may further include updating the weights associated with the first plurality of methods based on engagement by the first user with the second plurality of content recommendations.

31 Claims, 5 Drawing Sheets

(56) References Cited

U.S. PATENT DOCUMENTS

| | | | |
|---|---|---|---|
| 2010/0042460 A1* | 2/2010 | Kane, Jr. ............................ 705/9 |
| 2010/0042608 A1* | 2/2010 | Kane, Jr. ............................ 707/5 |
| 2010/0268710 A1* | 10/2010 | Strehl ............... G06F 17/30648 707/732 |
| 2012/0016875 A1* | 1/2012 | Jin .................... G06F 17/30867 707/734 |
| 2012/0254165 A1* | 10/2012 | Brdiczka ........... G06F 17/30675 707/728 |
| 2012/0296971 A1* | 11/2012 | Brown ........................... 709/204 |
| 2013/0041876 A1* | 2/2013 | Dow et al. .................... 707/706 |
| 2013/0066819 A1* | 3/2013 | Nice ................. G06F 17/30029 706/14 |
| 2015/0205490 A1* | 7/2015 | Nordstrom .......... G06F 3/04842 715/739 |

* cited by examiner

SYSTEMS AND METHODS FOR PROVIDING PERSONALIZED RECOMMENDATIONS FOR ELECTRONIC CONTENT

TECHNICAL FIELD

The present disclosure generally relates to techniques for recommending electronic content to a user. In particular, and without limitation, the present disclosure relates to systems and methods for providing recommendations for electronic content to a user and updating such recommendations based on, for example, a user's browser history, preferences, social network data, and the like.

BACKGROUND

Today, the Internet represents a vital information resource for both the sophisticated user and the novice. The popularity of the Internet as an information source is due, in part, to the vast amount of information available and to the relative ease with which that information may be accessed. However, the enormity of the information available to user does not alone address the dynamically-evolving needs and interests of users of the Internet.

Many web sites, and in particular, those associated with online news organizations, blogs, and content providers, provide pages or links to popular content that may be relevant to a user. For example, a news web site may recommend links to stories, images, and videos that are popular with users who have viewed the organization's web site. It has been empirically proven that delivering personalized content that is most likely to interest users visiting the web site plays a key role in attracting more users.

Some online media outlets may feature or implement recommendation modules that deliver personalized content to users. However, these conventional recommendation modules provide either general recommendations or provide recommendations for electronic content based on selected categories or key words and/or profiles that are associated with a user. Moreover, many fail to provide or update specific recommendations for electronic content based on real time events, data, and/or trends associated with a user.

In view of the foregoing, there is a need for improved systems and methods for recommending electronic content to a user. Moreover, there is a need for improved techniques for providing personalized recommendations for electronic content and updating such recommendations for users to address, for example, real time or dynamic data, events, and/or trends.

SUMMARY

Consistent with embodiments of the present disclosure, computer-implemented systems and methods are provided for providing content recommendations to users. According to one embodiment, a method for providing content recommendations to a plurality of users is provided. The method may include generating a first plurality of content recommendations for a first user using a first plurality of methods, each of the first plurality of methods having a weight associated therewith. The method may further include selecting a second plurality of content recommendations from the first plurality of content recommendations based on the weights associated with the first plurality of methods. The method may further include providing the second plurality of content recommendations to the first user. The method may further include updating the weights associated with the first plurality of methods based on engagement by the first user with the second plurality of content recommendations.

According to another embodiment, a system for providing content recommendations to a plurality of users, is provided. The system may include at least one hardware processor and a memory storing instructions to be executed by the at least one hardware processor. The at least one hardware processor may be configured by the instructions to generate a first plurality of content recommendations for a first user using a first plurality of methods, each of the first plurality of methods having a weight associated therewith. The at least one hardware processor may be further configured to select a second plurality of content recommendations from the first plurality of content recommendations based on the weights associated with the first plurality of methods. The at least one hardware processor may be further configured to provide the second plurality of content recommendations to the first user. The at least one hardware processor may be further configured to update the weights associated with the first plurality of methods based on engagement by the first user with the second plurality of content recommendations.

According to yet another embodiment, a non-transitory computer-readable storage medium storing instructions for enabling a processor to execute a method for providing content recommendations to a plurality of users, is provided. The method may include generating a first plurality of content recommendations for a first user using a first plurality of methods, each of the first plurality of methods having a weight associated therewith. The method may further include selecting a second plurality of content recommendations from the first plurality of content recommendations based on the weights associated with the first plurality of methods. The method may further include providing the second plurality of content recommendations to the first user. The method may further include updating the weights associated with the first plurality of methods based on engagement by the first user with the second plurality of content recommendations.

It is to be understood that both the foregoing general description and the following detailed description are exemplary and explanatory only, and are not restrictive of the invention as claimed. Further, the accompanying drawings, which are incorporated in and constitute a part of this specification, illustrate embodiments of the present disclosure and together with the description, serve to explain principles of the invention as set forth in the accompanying claims.

BRIEF DESCRIPTION OF THE DRAWINGS

The accompanying drawings, which are incorporated in and constitute a part of this specification, illustrate several embodiments of the present disclosure and together with the description, serve to explain the principles of the present disclosure.

DETAILED DESCRIPTION OF THE EMBODIMENTS

Reference will now be made in detail to embodiments of the present disclosure, examples of which are illustrated in the accompanying drawings. The same reference numbers will be used throughout the drawings to refer to the same or like parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

Embodiments of the present disclosure relate to computer-implemented systems and methods for providing content recommendations to users. As used herein, "electronic content" or "content" refers to any digital object that can be displayed or presented to a user, either in the form of audio, text, images, or video, as well as any combination thereof. Examples of electronic content include video files, audio files, text files, etc. that can be accessed directly through a web page, a link, and/or downloaded or streamed. Advertisements in any form, including banner ads and video ads, are examples of electronic content. Recommendations to a web page or any other digital object, are also examples of electronic content. Further, news articles, books, songs, videos, movies, etc. are also examples of electronic content or content.

Figure 1:
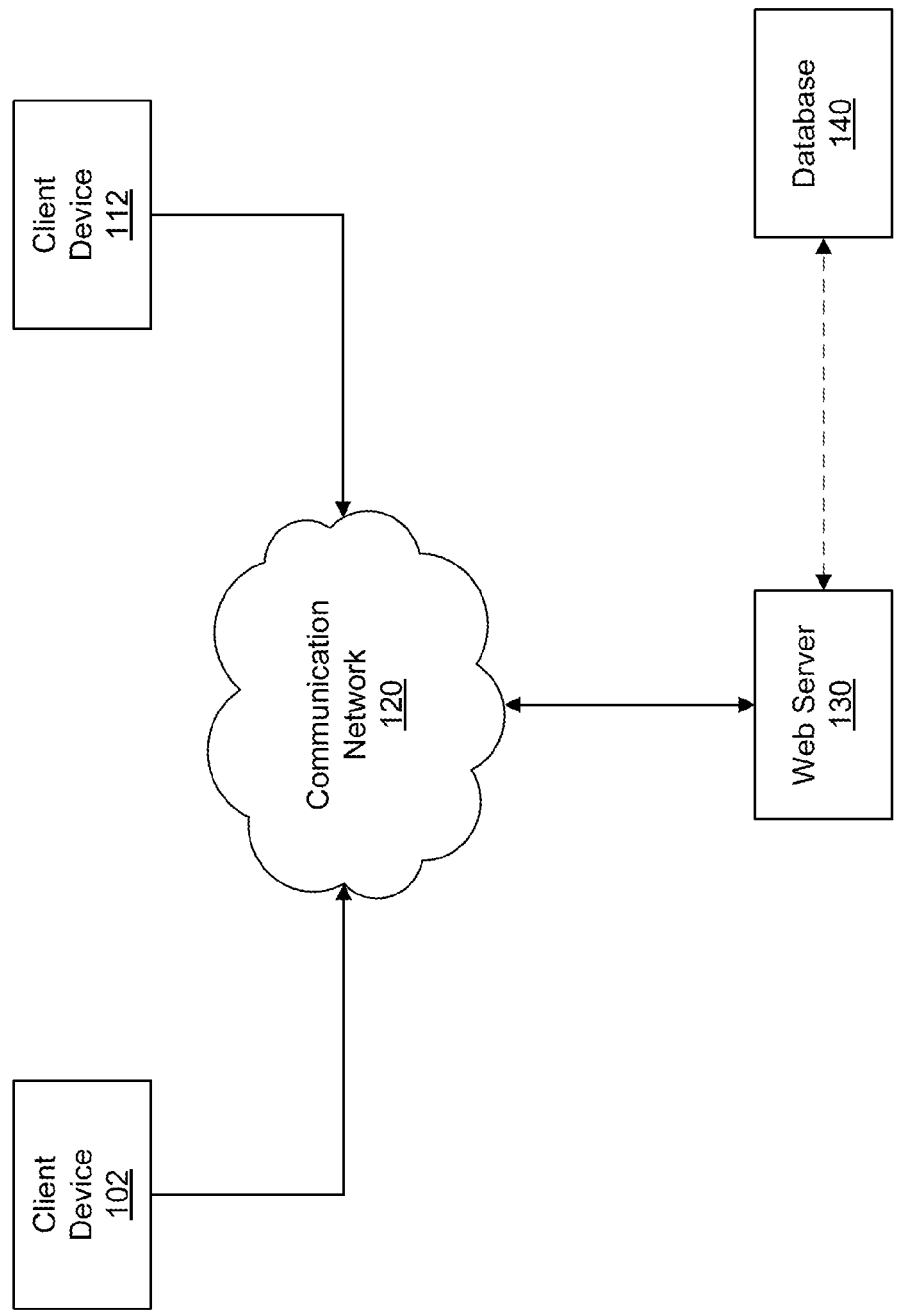
FIG. 1 is a diagram of an exemplary computing environment within which embodiments of the present disclosure may be practiced.
Figure 3:
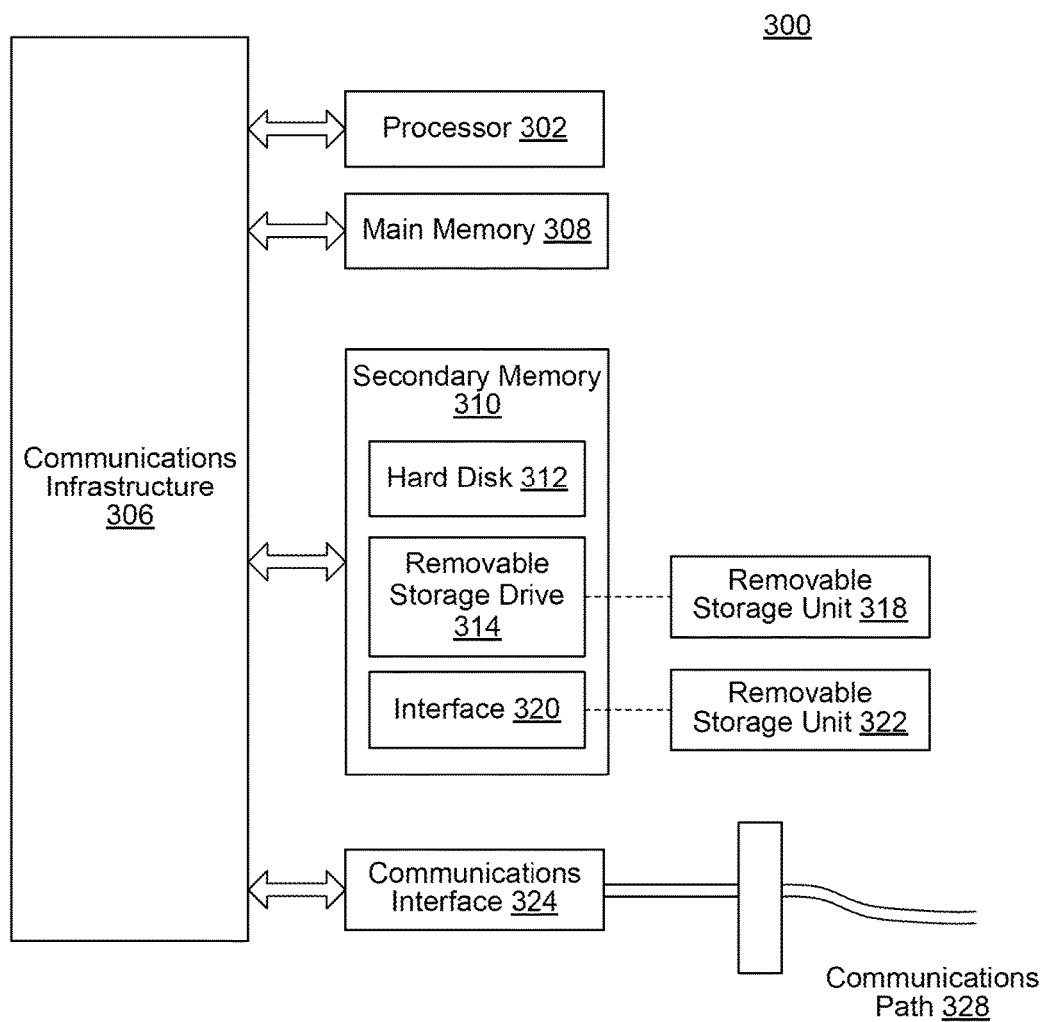
FIG. 3 is a diagram of an exemplary computer system, consistent with embodiments of the present disclosure.

FIG. 1 illustrates an exemplary computing environment 100 within which embodiments of the present disclosure may be practiced. In FIG. 1, a web server 130, a database 140, and a plurality of client devices (including client devices 102 and 112) are interconnected via a communications network 120. In an embodiment, client devices 102 and 112 can include, but are not limited to, a personal computer, a laptop computer, a notebook computer, a hand-held computer, a personal digital assistant, a portable navigation device, a mobile phone, a smart phone, or any additional or alternate computing device operable to transmit and receive data across network 120. Client devices 102 and 112, web server 130, and database 140 may represent any type of computer system capable of performing communication protocol processing. An example of such a computer system 300 described with reference to FIG. 3. Furthermore, FIGS. 1 and 3 are further described below after the description for FIG. 5.

Figure 2:
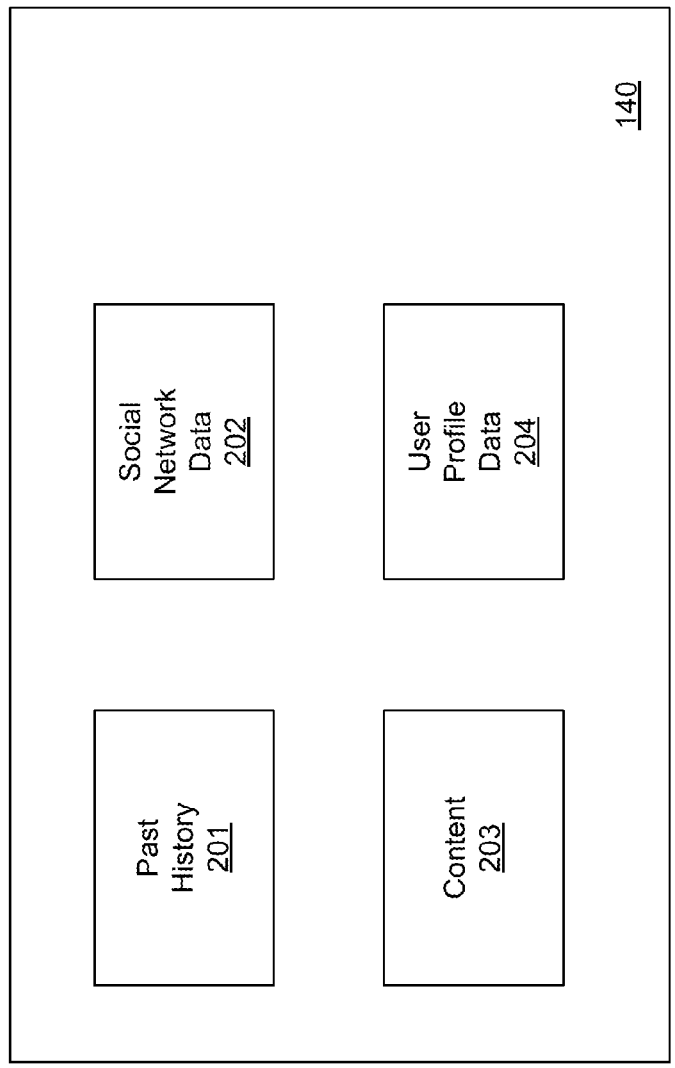
FIG. 2 is a diagram of an exemplary database, consistent with embodiments of the present disclosure.

FIG. 2 illustrates a diagram of an exemplary database 140, consistent with embodiments of the present disclosure. As shown in FIG. 2, exemplary database 140 may store a wide variety of information that may be used by web server 130 to provide recommendations or personalized content to users of client devices 102. For example, database 140 may store data including past history data 201, social network data 202, content 203, and user profile data 204. Past history data 201 may include details regarding a user's past browsing history or preferences, such as web sites visited, articles read, etc.

Social network data 202 may include data retrieved from a user's social network. For example, social network data 202 may include certain kinds of data retrieved from one or more social network accounts of each user, such as the user's Facebook account, Twitter account, LinkedIn account, Pinterest account, about.me, and/or other social network accounts of the user. Exemplarily, social network data 202 may include information on articles or pages user shared/liked/read in his or her social network account. Social network data 202 may further include any comments a user provided about an article in her social network. Data 202 may further include title and description of articles that a user's friends posted on his or her wall or comments that the user's social network provided for articles or pages that the user shared/liked/read. The above are only few examples of social network data 202 that may be retrieved from the user's social network. Thus, the above examples of social network data 202 are not intended to be limiting or controlling with respect to the above mentioned kinds of data.

Database 140 may also store content 203 and user profile data 204. Content 203 may include a wide variety of electronic content or content that may be recommended to the user. As stated earlier, electronic content or content may refer to any digital object that can be displayed or presented to a user, either in the form of audio or video or a combination thereof. Examples of electronic content may include video files, audio files, text files, etc. that can be accessed directly through a web page, a link, and/or downloaded or streamed. Advertisements are examples of electronic content. Further, news articles, books, songs, videos, movies, etc., are also examples of electronic content or content.

User profile data 204 may include user demographic information such as name, age, sex, employer, college, high school, location, language spoken, etc. User profile data 204 may be either entered by the user as part of login information or other information provided by the user, or may be retrieved from the user's social network, or through other means. User profile data 204 may also include one or more content-based preferences of the user. Such content-based preferences may include, but are not limited to, specific classes of electronic content preferred by the user. For example, content-based preferences may include a user's desire to view electronic content related to breaking local news during a morning commute, and electronic content related to sports and celebrity gossip during an evening commute. In addition, the content-based preferences may also specify one or more editorial, contextual, and structural preferences of the user. For example, the editorial preferences may include, but are not limited to, an interest in a specific author (or artist) or an interest in a specific group of authors (or artists). Contextual preferences may be specified in the profile based on, for example, keywords that are descriptive of content of interest to the user. Further, for example, the structural information may include, but is not limited to, a position of content within a displayed web page (e.g., a headline slot) and a position of content within a specific section of a web page (e.g., a first slot within the sports section of a news provider).

Figure 4:
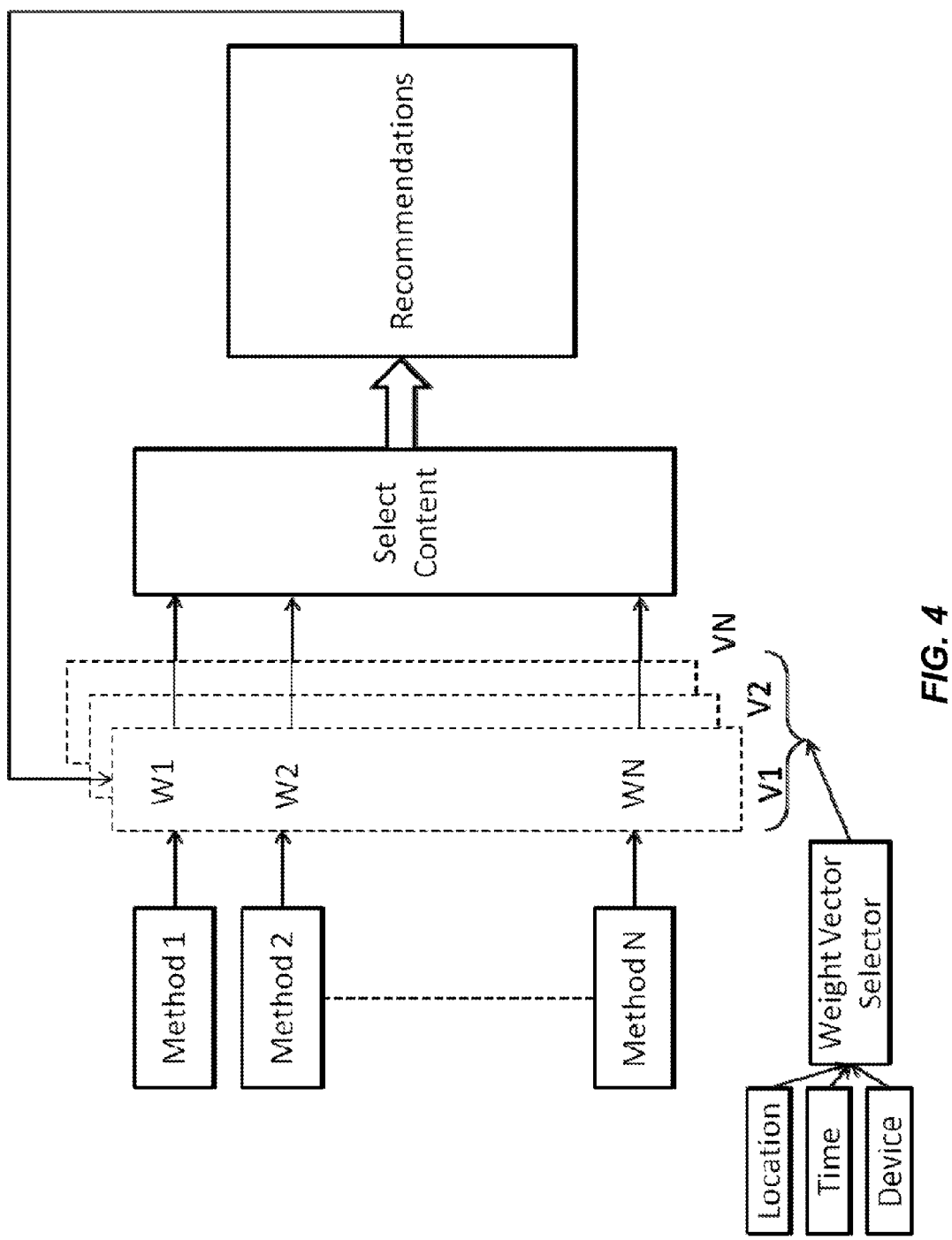
FIG. 4 illustrates an exemplary architecture for providing recommendations for electronic content to a client device, consistent with embodiments of the present disclosure.

FIG. 4 illustrates an exemplary architecture for providing recommendations for electronic content to a client device, consistent with embodiments of the present disclosure. The exemplary architecture of FIG. 4 may be implemented by web server 130 for providing personalized content or content recommendations to a plurality of users, such as users of client device 102 and client device 112.

Web server 130 may comprise a server for a content provider such as Huffington Post, Yahoo, etc. Web server 130 may support one or more web pages visited by a plurality of users. On each of the web pages, web server 130 may provide a variety of content such as news articles, video, audio, etc. When a user visits a web page supported by web server 130, a user may browse the content provided on the web page. While the user is browsing content, web server 130 may recommend additional content for the user. The recommended content may be personalized to the user. Once content to be recommended is determined, using techniques discussed later, the content recommendation may be communicated to the user in a suitable form such as a link to an article, web page, audio file, video file, etc. Presentation of the recommended content may include, in addition to presenting a link to the electronic content, displaying a few words or a short summary about the article or other electronic content that is being recommended. If the recommendation is for an audio or video file, an option to play the audio or video file may be presented.

According to FIG. 4, a number of methods (e.g., method 1 through method N) may exist for each user for recommending content to that user. Each of the methods in FIG. 4 may provide recommendations for a user based on a set of certain criteria that may be different across methods. Each of the methods may provide more than one recommendations and assign a score for each of the recommendations. For example, method 1 may recommend three articles (article 1, article 2, article 3) for a user and assign a score (S1, S2, S3) to each of the three articles. The assigned score may indicate the likelihood, according to the method, that the user may engage with or like the recommended article. Similarly, the remaining methods may also provide recommendations for articles and assign a score to each of the recommendations. For example, method 2 may recommend five articles (article 4, article 5, article 6, article 7, article 8) and assign scores (S4, S5, S6, S7, S8) to the articles. It is possible that one or more of the methods may not provide any recommendations under certain conditions. For example, if method 5 provides recommendations based on activity associated with the user's Facebook account and the user does not have a Facebook account or there has not been any relevant activity with respect to the user's Facebook account, method 5 may not provide any recommendations. For each user, each of the methods may also have associated with it a weight. For example, as shown in FIG. 4, method 1 may have associated therewith a weight W1, method 2 may have associated therewith a weight W2, etc. Weights W1 thru WN may form a weight vector, for example V1. One or more weight vectors may be used for each user. At any given instant, a weight vector may be selected based on circumstantial factors including, but not limited to, the user's location, the time of the day, the device type of the user, etc. For example, if the user is accessing the web page through a mobile device, certain methods are more likely than other methods to generate recommendations that the user would like. Accordingly, a weight vector may be selected so as to advantage certain methods over other methods.

Once, each of the methods have generated recommendations for the user and assigned scores to each of the recommendations, a final score may be calculated for each of the recommendations. So, for example, a final score for article 1 recommended by method 1 may be calculated based on the initial score (S1) and the weight (W1) associated with method 1 that recommended article 1. The final score may be calculated in a variety of ways. For example, a final score for article 1 may be calculated as S1 times W1.

Next, a subset of recommendations may be selected from the complete set of recommendations provided by the different methods and presented to the user. For example, if a total of 100 articles were recommended in total by all the methods, a subset (for example, 5, 10, 12, etc.) may be selected for presenting to the user. The subset of articles may be selected in a variety of ways. In one exemplary embodiment, the articles with the highest final score may be selected. If an article is recommended by more than one of the methods, say article 2 is recommended by both methods 1 and 3, the final score for article 2 may be boosted by adding the final scores for article 2 from methods 1 and 3, or by some other technique. In another exemplary embodiment, a certain number of articles may be selected for each of the methods based on the weight of the method and the final scores of the articles. For example, if method 1 has the highest weight amongst the methods, 5 articles or another number of articles with the highest score may be selected from the articles recommended by method 1. If method 2 has the second highest weight, 4 articles or another number of articles may be selected from the articles recommended by method 2. It will be noted that many other ways to select the subset of articles to be presented to the user will be apparent to a skilled artisan. Additionally, web server 130 may maintain a recommendation history which shows the association between a method and an article that was presented to the user in the subset of articles. For example, if article 2 recommended by method 1 was selected as part of the subset of articles presented to the user, the recommendation history would retain information that article 2 was recommended by method 1.

Once the subset of articles are presented to the user as recommended content, the weights of each of the methods may be updated or modified based on the user's interaction or engagement with the recommended content. For example, if the user interacts with one of the recommended articles by clicking on a link to the recommended article, sharing, communicating (e.g., distributing an electronic message via an online service such as Twitter), etc., such interaction may be used to increase the weight of the method(s) which recommended the article by identifying the corresponding method for the article by looking in the recommendation history. According to certain exemplary embodiments, the weights of methods that generated articles that the user did not interact with may be decreased.

In an exemplary embodiment, all methods (1 thru N) may start initially with equal weights of 1/N. Every time a positive feedback is received (for example, if the user interacted with a recommended article), the method(s) that contributed in recommending the article may be rewarded by incrementing the corresponding weight based on a bonus distribution scheme. Likewise, the method(s) that failed to contribute may be penalized by decrementing the corresponding weight based on a penalty distribution scheme. An exemplary bonus distribution scheme may be to increase the previous weight with the fixed amount, for example by 0.1/(N times the number of methods to reward), or by the fixed ratios, for example, by (10/the number of methods to reward) %. The amount of the penalty may be the same as the amount of bonus, and the penalty may be distributed evenly among the methods that failed to produce the recommendation. In accordance with another embodiment, another example of a bonus/penalty distribution scheme may be based on a logistic function where the maximum and minimum weight each of the methods can have is predefined.

By constantly updating weights of the different methods, it may be possible to provide more personalized recommendations to the user. In turn, this may cause an increase in user traffic for the web page supported by web server 130. Next, examples of different methods that may be executed by web server 130 as method 1, method 2, etc. is provided.

According to a first group of methods, content recommendations may be generated by utilizing data from the user's social network(s). For example, a user may visit a web page supported by web server 130 and provide login information and permission to access one of the user's social network account. As an illustration, the social network may be Facebook. Using the login information, web server 130 may access the user's Facebook account and retrieve information such as a list of articles posted by the user's friends on the user's wall, articles user has commented on or liked, articles that the user has read through Facebook, articles that the user's friends have read or engaged with, etc. Web server 130 may then store the retrieved articles in social network data 202 in database 140 or may extract keywords or topics from the retrieved articles and store the extracted keywords or topics in social network data 202. The keywords or topics may be extracted using a variety of techniques. For example, there could be two types of data that are extracted from the user's social network. One type of data may be explicit data such as URLs to known articles where the topics that the user is interested in are readily available. The other type of data may be implicit data such as any wall posts, etc. For the latter type of data, keyword extraction using natural language processing techniques may be employed, followed by other information retrieval techniques using the extracted keywords as feature vectors. Tf-idf based search and SVM-based classification are examples of such keyword techniques.

Methods within the first group of methods may differ from each other based on the technique used to extract the keywords. For example, a method 1.1 may be a method that utilizes td-idf based search to extract keywords or topics from the user's Facebook data. A method 1.2 may be a method that utilizes SVM-based classification to extract keywords or topics from the user's Facebook data. For each of the methods (1.1, 1.2, etc.) web server 130 may match articles stored as content 202 in database 140 with the keywords or topics extracted from the user's Facebook account. The articles that match the keywords or topic would be the output of the methods (1.1, 1.2, etc.) and a rank or score may be assigned to each of the articles based on the degree of matching between the articles and the keywords or topics. In certain exemplary embodiments, web server 130 may continue to extract information from the user's social network account even after the user has left the web page. In such a case, if the user comes back to the web page, web server 130 may be ready to provide recommendations to the user immediately and hence, provide a more personalized experience to the user.

Methods within the first group of methods may also differ from each other based on the social networks that they are associated with. For example, methods 1.1 and 1.2 were associated with Facebook. Methods 1.3 and 1.4 may be identical to methods 1.1 and 1.2, respectively, but may utilize data from another social network such as Twitter, Orkut, etc.

A second group of methods may provide content recommendations by profiling a user based on a user's past actions. Consider a method 2.1.1 and user 1 for whom method 2.1.1 is generating recommendations. In method 2.1.1, web server 130 may find other users similar to user 1 and generate recommendations for user 1 based on articles that other similar users have read but user 1 has not read. For example, if user 1 has read articles 1 and 2, and user 2 has read articles 1 and 2 also, user 1 may be classified as being similar to user 2. Now, if user 2 has also read article 3, method 2.1.1 may recommend article 3 for user 1. Generally speaking, method 2.1.1 may cluster sets of users based on articles they have read and then assign user 1 to some cluster based on articles user 1 has read. If user 1 has not read articles that users of the cluster to which user 1 has been assigned, have read, then method 2.1.1 may recommend those unread articles for user 1. In an exemplary embodiment, method 2.1.1 may be further subdivided into two different methods based on whether user 1 has an account with web server 130. According to one method (2.1.1.1), if user 1 has an account with web server 130, user 1's detailed past browsing history may be used to assign user 1 to a certain cluster of users. According to another method (2.1.1.2), if user 1 is a new user and web server 130 does not have detailed browsing history for user 1, web server 130 may retrieve user 1's browsing history by extracting a browser cookie for user 1. Using the browsing history from the cookie, user 1 may be classified to one of the clusters.

While method 2.1.1 is based on cluster based filtering, a method 2.1.2 may be based on collaborative filtering to determine similar users. In this method, similar articles may be identified by a user article matrix. For example, if user 1 read articles 1, 5 and 6, user 2 read articles 1, 5 and 7, and user 3 read articles 5, 8, and 9, a corresponding user-item matrix is constructed. A similarity measure, such as cosine similarity, may then be computed to find out whether users 1 and 2 are more similar than other user pairs.

Another method 2.2.1, which is similar to method 2.1.1, but which uses tags of articles read by user 1 may also be implemented by web server 130. In method 2.1.1, a user was classified into a cluster of users based on articles read by the user. In method 2.2.1, user 1 may classified into a cluster of users similar to user 1 based on similarity of tags associated with articles read by user 1 and tags of articles read by other users. For example, if user 1 has read several articles which have the tag "technology" associated with them, user 1 may be classified into a cluster of users who have also read several articles with tag "technology." After classification, method 2.2.1 may recommend to user 1 articles that users of the cluster to which user 1 has been assigned, have read but have not been read by user 1. Like, method 2.1.1, method 2.2.1 may be further subdivided into two different methods 2.2.1.1 and 2.2.1.2 based on whether user 1 has an account with web server 130.

A method 2.2.2, which is similar to method 2.1.2, may also be provided. Method 2.2.2. may determine similar users based on collaborative filtering. Here, instead of the user-article matrix, a user-tag matrix may be constructed. The same similarity measure as method 2.1.2 such as cosine similarity may be employed.

Another method that may use a user's past browsing history is method 2.3.1. In this method, clusters are formed for articles based on either similarity of tags or similarity of users that have read the articles. For example, if article 1 and article 2 have both been read by user A, article 1 and 2 may be classified into a cluster (say cluster 1) as being similar. Similarly, if article 1 and article 2 share the same tags, articles 1 and 2 may be classified into a cluster. Accordingly, clusters of articles may be created. Next, it may be determined whether user 1 has read several articles from one of the cluster of articles. If user 1 has read several articles from say cluster 1, method 2.3.1 may recommend for user 1 articles from cluster 1 that user 1 has not read.

A method 2.3.2, which is similar to method 2.1.2, may be used to determine similar articles based on collaborative filtering. Here, instead of the user-article matrix, a user-(article-cluster) matrix may be constructed. Like method 2.1.2, a cosine similarity measure may be employed.

A third group of methods similar to the second group of methods (2.1.1, 2.1.2, 2.2.1, 2.2.2, 2.3.1, 2.3.2) may also be implemented by web server 130. A difference between the third group of methods and the second group of methods is that the second group of methods utilized a user's browsing history, i.e., which articles the user has read, whereas the third group of methods may utilize a user's article sharing history. For example, according to a method 3.1.1, user 1 may be classified as belonging to a cluster of users if user 1 has shared one or more articles that users in the cluster have also shared. Exemplarily, a user may share articles through her social network like Facebook. A user may also share articles by e-mailing articles from a web page supported by web server 130. Once classified into a cluster, method 3.1.1 may recommend articles to user 1 that have been shared by other users in the cluster but have not been shared by user 1. Alternatively, once classified into a cluster, method 3.1.1 may recommend articles to user 1 that have been read by other users in the cluster but have not been read by the user. Accordingly, under the latter approach, a difference between method 3.1.1 and 2.1.1 is the basis on which a user is deemed similar to other users. Moreover, a method 3.1.2 may be provided where instead of clustering, collaborative filtering may be utilized to generate content recommendations.

The third group of methods may also include a method 3.2.1 that is similar to method 2.3.1 except that the articles are clustered based on sharing. For example, in method 3.2.1, articles may be clustered if the same user has shared them. Like method 2.3.1, it may be determined whether user 1 has read several articles from one of the cluster of articles. If user 1 has read several articles from say cluster 1, method 3.2.1 may recommend for user 1 articles from cluster 1 that the user has not read. Moreover, a method 3.2.2 may be provided where instead of clustering, collaborative filtering may be utilized to generate content recommendations.

A fourth group of methods may also be implemented by web server 130. In the fourth group of methods, web server 130 may determine users similar to a user based on the user's demographic information such as age, sex, location, preferences, high school, etc. A user's demographic information may be retrieved from user profile data 204 in database 140. Based on the demographic information, users similar to a user (for example, user 1) may be determined and articles may be recommended for user 1 that have not been read by user 1 but have been read by users determined similar to user 1.

While exemplary methods have been described above, it will be understood that several other methods may be implemented by web server 130. Moreover, it will be understood that the above methods may be executed for a single user and that the same or different methods may be simultaneously executed for another user. That is, one or more of the above methods may be simultaneously executed for more than one user and updated based on each user's feedback. For example, a first group of methods with a first group of weights may be executed for user 1 and adapted on a real time basis based on user 1's engagement with the recommended content. A second group of methods with a second group of weights may be executed for user 2 when the first group of methods is executing, and adapted on a real time basis based on user 2's engagement with the recommended content.

By generating recommendations from several methods based on a diverse data set for a particular user and updating weights for each of the methods based on that user's engagement with the recommended content, more personalized content that is likely to interest the user may be presented to the user. The exemplary implementation discussed above has several advantages and distinctions over conventional implementations for recommendation modules. Among other things, an aspect of the above exemplary implementation that may not be present in conventional recommendation modules is the ability to leverage a substantial amount of information for each user and adaptively execute different methods for the user based on feedback from the user.

Figure 5:
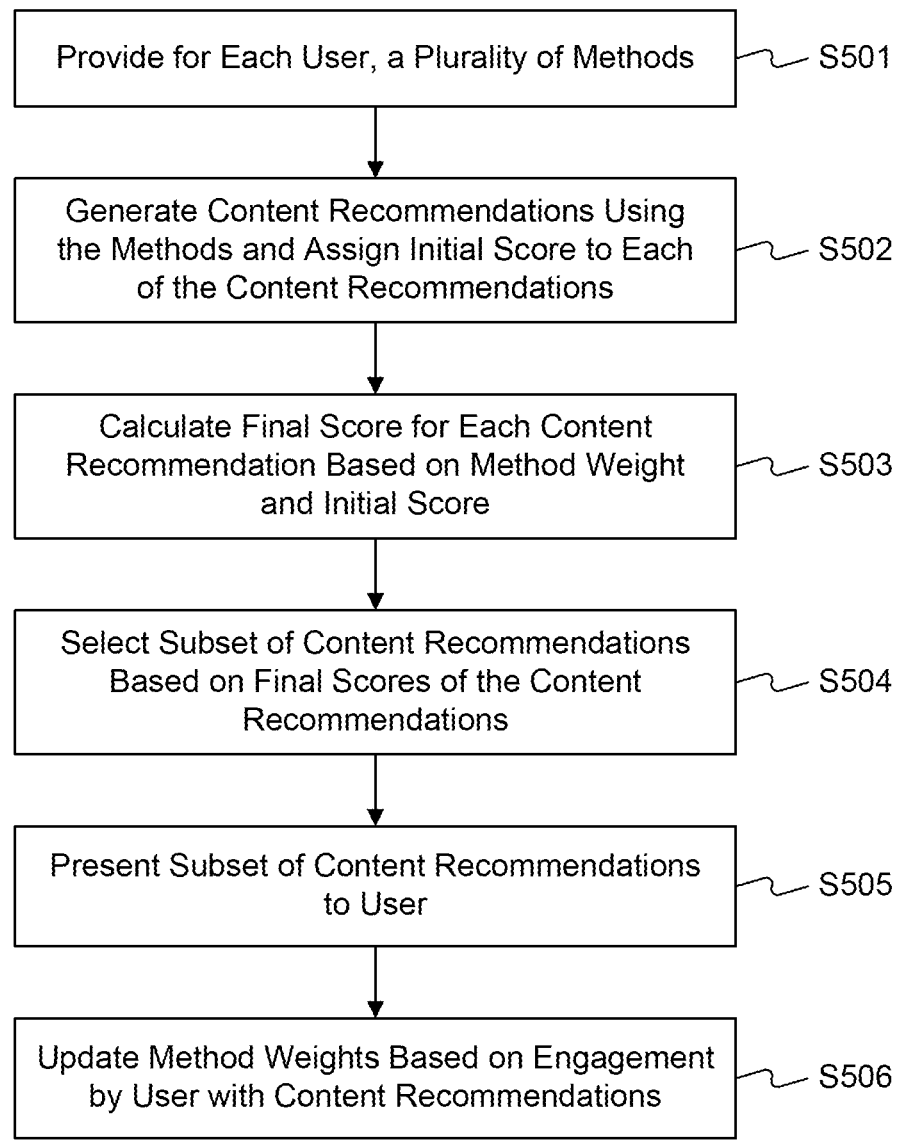
FIG. 5 illustrates an exemplary method for providing recommendations for electronic content to a client device, consistent with embodiments of the present disclosure.

FIG. 5 is a flow diagram of an exemplary method 500 for providing content recommendations to a user of a client device. Exemplarily, method 500 may provide functionality to enable a web server, e.g., web server 130, to generate content recommendations for a user and provide the content recommendations to the user.

As indicated above, a user of a client device 102 or 112 may visit a web page supported or enabled by web server 130. To provide content recommendations to the user, web server 130 may allocate or provide in step 501 a plurality of methods that generate content recommendations for the user. If multiple users are visiting the web page, web server 130 may provide a plurality of methods for each of the users. For example, web server 501 may provide one or more of above-described methods 1.1, 1.2, 1.3, 1.4, 2.1.1, 2.1.2, 2.2.1, 2.2.2, 2.3.1, 2.3.2, 3.1.1, 3.1.2, 3.2.1, 3.2.2, etc. for user 1.

In step 502, each of the provided methods may generate content recommendations and assign an initial score to each of the generated content recommendations. For example, if method 1.1 recommends articles 1 and 2, method 1.1 may assign an initial score S1 and S2 to articles 1 and 2, respectively. Similarly, if each of the provided methods generates one or more recommendations, an initial score may be assigned to the recommendations.

In step 503, a final score may be calculated for each of the content recommendations. As noted earlier, each of the methods may be associated with a weight. A final score may be calculated for a recommendation based on the weight of the method that generated the recommendation and the initial score of the recommendation. For example, if a weight W1 is associated with method 1.1 and an initial score of article 1 recommended by method 1.1 is S1, a final score for article 1 may be calculated as S1×W1 or by using a different algebraic combination of S1 and W1.

Next, in step 504, a subset of the generated recommendations may be selected by web server 130 based on the final scores of the recommendations. For example, if 100 articles were recommended in total by all the methods, a subset (for example, 5, 10, 12, etc.) may be selected for presenting to the user. The subset of articles may be selected in a variety of ways. In one exemplary embodiment, the articles with the highest final score may be selected. If an article is recommended by more than one of the methods, say article 2 is recommended by both methods 1.1 and 2.1.2, the final score for article 2 may be boosted by adding the final scores for article 2 from methods 1.1 and 2.1.2, or by some other technique. In another exemplary embodiment, a certain number of articles may be selected for each of the methods based on the weight of the method and the final scores of the articles. For example, if method 1.1 has the highest weight amongst the methods, 5 articles or another number of articles with the highest score may be selected from the articles recommended by method 1. If method 2.1.2 has the second highest weight, 4 articles or another number of articles may be selected from the articles recommended by method 2.1.2. It will be noted that many other ways to select the subset of articles to be presented to the user will be apparent to a skilled artisan.

In step 505, the selected subset of articles may be presented as content recommendations to the user. By way of example, the content recommendations may be displayed to the user as a link to an article, audio file, video file, etc. The content recommendation may include in addition to a link, a few words or a short summary about the article that is being recommended. If the recommendation is for an audio or video file, an option to play the audio or video file may be presented as the content recommendation. In one embodiment, each of the selected content recommendations may be simultaneously displayed on the web page the user is browsing. In another embodiment, the selected content recommendations may be displayed to the user in a time series manner where the content recommendations are presented one after another or in small groups.

In step 506, web server 130 may update the weights of each of the methods based on the user's interaction or engagement with the recommended content. For example, if the user interacts with one of the content recommendations by clicking, sharing, communicating (i.e., distributing an electronic message via an online service such as Twitter), etc, such interaction may be used to increase the weight of the method(s). According to certain exemplary embodiments, the weights of methods that generated content recommendations that the user did not interact with may be decreased.

The process may return back to step 501 and continue until the user is browsing web pages supported or enabled by web server 130.

Further details on FIGS. 1 and 2 are now provided. Although the exemplary embodiment of FIG. 1 illustrates computing environment 100 with client devices 102 and 112 in communication with web server 130, persons of ordinary skill in the art will recognize that computing environment 100 may include any number of additional mobile or stationary client devices (as well as associated users), and any number of additional web servers without departing from the spirit or scope of the present disclosure. Furthermore, although computing environment 100 of FIG. 1 is illustrated with a single web server 130, web server 130 may be implemented as a system comprising a plurality of servers or a server farm, and computing environment 100 can include any number of web servers in communication with one another without departing from the spirit or scope of the present disclosure.

Communications network 120 may represent any form or medium of digital data communication. Examples of communication network 120 include a local area network ("LAN"), a wireless LAN, e.g., a "WiFi" network, a wireless Metropolitan Area Network (MAN) that connects multiple wireless LANs, and a wide area network ("WAN"), e.g., the Internet. In the embodiments described herein, the Internet may include any publicly-accessible network or networks interconnected via one or more communication protocols, including, but not limited to, hypertext transfer protocol (HTTP) and transmission control protocol/internet protocol (TCP/IP). Moreover, communications network 120 may also include one or more mobile device networks, such as a GSM network or a PCS network, that allow mobile devices to send and receive data via applicable communications protocols, including those described above.

Referring again to FIG. 1, computing environment 100 also includes a database 140 in communications with web server 130. By way of example, web server 130 and database 140 may be incorporated into a single hardware unit, such as a single computer or server system. In such an embodiment, database 140 may be incorporated into, or stored within, a storage medium or storage device of web server 130, as described in FIG. 3, for example.

However, web server 130 and database 140 are not limited to such configurations, and, in additional embodiments, database 140 may reside on any additional or alternate computer or server accessible to web server 130 without departing from the spirit of scope of the present invention. For example, web server 130 and database 140 may form individual hardware components of a private network associated with web server 130, and may be in communications across wired or wireless link 150. Alternatively, database 140 may be associated with a separate hardware component, e.g., a server, capable of communication with web server 130 across communications network 120 using any of the communications protocols outlined above.

In this disclosure, reference is made to client device 102, web server 130, and database 140. However, one of skill in the art will realize that the reference to client device 102, web server 130, and database 140 are for explanatory purposes only, and in additional embodiments, the exemplary techniques described above may be practiced using any additional or alternate client device (e.g., client device 112 of FIG. 1), web server, or database apparent to one of skill in the art and capable of communications protocol processing within network 120.

FIG. 3 is an exemplary computer system 300, consistent with embodiments of the present disclosure. Computer system 300 includes one or more processors, such as processor 302. Processor 302 is connected to a communication infrastructure 306, such as a bus or network, e.g., network 120 of FIG. 1.

Computer system 300 also includes a main memory 308, for example, random access memory (RAM), and may include a secondary memory 310. Secondary memory 310 may include, for example, a hard disk drive 312 and/or a removable storage drive 314, representing a magnetic tape drive, an optical disk drive, CD/DVD drive, etc. The removable storage drive 314 reads from and/or writes to a removable storage unit 318 in a well-known manner. Removable storage unit 318 represents a magnetic tape, optical disk, or other computer-readable storage medium that is read by and written to by removable storage drive 314. As will be appreciated, the removable storage unit 318 can represent a computer-readable medium having stored therein computer programs, sets of instructions, code, or data to be executed by processor 302.

In alternate embodiments, secondary memory 310 may include other means for allowing computer programs or sets of instructions to be loaded into computer system 300. Such means may include, for example, a removable storage unit 322 and an interface 320. An example of such means may include a removable memory chip (e.g., EPROM, RAM, ROM, DRAM, EEPROM, flash memory devices, or other volatile or non-volatile memory devices) and associated socket, or other removable storage units 322 and interface 320, which allow instructions and data to be transferred from the removable storage unit 322 to computer system 300.

Computer system 300 may also include one or more communications interfaces, such as communications interface 324. Communications interface 324 allows computer software, instructions, and/or data to be transferred between computer system 300 and external devices. Examples of communications interface 324 may include a modem, a network interface (e.g., an Ethernet card), a communications port, a PCMCIA slot and card, a wireless transmitter or card, etc. Computer software, instructions, and/or data may be transferred via communications interface 324 in the form of signals 326, which may be electronic, electromagnetic, optical or other signals capable of being received by communications interface 324. These signals 326 are provided to communications interface 324 via a communications path (i.e., channel 328). Channel 328 carries signals 326 and may be implemented using wire or cable, fiber optics, an RF link, wireless transmissions, and other communications channels. In an embodiment, signals 326 comprise data packets sent to processor 302. Information representing processed packets can also be sent in the form of signals 326 from processor 302 through communications path 328.

The terms "storage device" and "storage medium" may refer to particular devices including, but not limited to, main memory 308, secondary memory 310, a hard disk installed in hard disk drive 312, and removable storage units 318 and 322. Further, the term "computer-readable medium" may refer to devices including, but not limited to, a hard disk installed in hard disk drive 312, any combination of main memory 308 and secondary memory 310, and removable storage units 318 and 322, which respectively provide computer programs and/or sets of instructions to processor 302 of computer system 300. Such computer programs and sets of instructions can be stored within one or more computer-readable media. Additionally or alternatively, computer programs and sets of instructions may also be received via communications interface 324 and stored on the one or more computer-readable media.

Such computer programs and instructions, when executed by processor 302, enable processor 302 to perform one or more of the computer-implemented methods described herein. Examples of program instructions include, for example, machine code, such as that code produced by a compiler, and files containing a high-level code that can be executed by processor 302 using an interpreter.

The computer-implemented methods described herein can also be implemented on a single processor of a computer system, such as processor 302 of system 300. In another embodiment, computer-implemented methods consistent with embodiments of the invention may be implemented using one or more processors within a single computer system, and additionally or alternatively, these computer-implemented methods may be implemented on one or more processors within separate computer systems linked via a network.

Various embodiments have been described herein with reference to the accompanying drawings. It will, however, be evident that various modifications and changes may be made thereto, and additional embodiments may be implemented, without departing from the scope of the present disclosure or the subject matter as set forth in the claims that follow.

Further, other embodiments will be apparent to those skilled in the art from consideration of the specification and practice of one or more embodiments of the disclosed herein. It is intended, therefore, that this disclosure and the embodiments herein be considered as exemplary only, with a true scope and spirit of the present disclosure being indicated by the following listing of exemplary claims.

What is claimed is:

1. A computer-implemented method for providing electronic content recommendations to a plurality of users, comprising:
   generating, by at least one hardware processor, a first plurality of electronic content recommendations for a first user using a first plurality of methods, each of the first plurality of methods having a weight assigned based on a type of user device associated with the first user;
   assigning, by at least one hardware processor, initial scores to the first plurality of electronic content recommendations;
   calculating, by at least one hardware processor, determined scores for each of the first plurality of content recommendations by multiplying initial scores assigned to a content recommendation by weights associated with methods among the first plurality of methods that generated the content recommendation;
   aggregating, by at least one hardware processor, the determined scores for each of the first plurality of content recommendations;
   selecting, by the least one hardware processor, a second plurality of electronic content recommendations among the first plurality of content recommendations based on the aggregated scores, the second plurality including a first subset of content recommendations among the first plurality that were recommended using a method with a highest assigned weight and a second subset of content recommendations among the first plurality that were recommended using a method with a second highest assigned weight, the second subset including a lower number of recommendations than the first subset;
   providing, by at least one hardware processor, the first and second subset of the second plurality of electronic content recommendations to the user device for display to the first user; and
   constantly updating, by at least one hardware processor, the weights associated with the first plurality of methods based on the first user's interaction with the first and second subset of the second plurality of electronic content recommendations, the first user's interaction received as input to the user device,
   wherein updating the weights includes increasing weights associated with methods among the first plurality of methods that recommended recommendations among the second plurality of electronic content recommendations interacted with by the first user, and wherein increasing weights includes increasing weights associated with methods that recommended recommendations interacted with by the first user by $0.1/(n)$, n being a number of recommenders that recommended each recommendation interacted with by the first user.

2. The method of claim 1, further comprising:
   generating a third plurality of electronic content recommendations for a second user using a second plurality of methods, each of the second plurality of methods having a weight associated therewith;
   selecting a fourth plurality of electronic content recommendations among the third plurality of electronic content recommendations based on the weights associated with the second plurality of methods, the selecting including:

identifying a first method among the third plurality of methods with a highest weight and selecting a third subset of electronic content recommendations generated using the first method; and identifying a second method among the third plurality of methods with a second highest weight and selecting a fourth subset of electronic content recommendations generated using the second method, the third subset of electronic content recommendations generated using the first method including a greater number of electronic content recommendations than the fourth subset of electronic content recommendations generated using the second method;

providing the third and fourth subset of the plurality of electronic content recommendations to a second user device for display to the second user; and updating the weights associated with the second plurality of methods based on the second user's interaction with the third and fourth subset of the fourth plurality of electronic content recommendations, the second user's interaction received as input to the second user device.

3. The method of claim 2, wherein the first plurality of methods are different from the second plurality of methods.

4. The method of claim 2, wherein the first plurality of methods are executed in parallel with the second plurality of methods.

5. The method of claim 1, wherein:
the first plurality of electronic content recommendations includes a first electronic recommendation; and
the first method generates the first electronic recommendation by using electronic content from a social network of the first user.

6. The method of claim 1, wherein:
the first plurality of electronic content recommendations includes a first electronic recommendation;
the first method generates the first electronic recommendation; and
the first method includes determining users similar to the first user and determining electronic content read by the users similar to the first user.

7. The method of claim 6, wherein the users similar to the first user are determined based on electronic content shared by the first user and the users similar to the first user.

8. The method of claim 6, wherein the users similar to the first user are determined based on demographic information of the first user and the users similar to the first user.

9. The method of claim 1, wherein the first user's interaction with the second plurality of electronic content recommendations includes at least one of clicking, sharing, and providing to an online message service, an electronic content recommendation in the second plurality of electronic content recommendations.

10. The method of claim 1, wherein the first plurality of electronic content recommendations include at least one of an electronic recommendation for an advertisement, a video file, a text file, and an audio file.

11. The method of claim 1, wherein updating the weights associated with the first plurality of methods on the first user's interaction with the second plurality of electronic content recommendations further includes:
decreasing weights associated with methods among the first plurality of methods that recommended recommendations among the second plurality of electronic content recommendations not interacted with by the first user.

12. A system for providing electronic content recommendations to a plurality of users, comprising:

at least one hardware processor; and
a memory storing instructions to be executed by the at least one hardware processor, wherein the at least one hardware processor is configured by the instructions to:
generate a first plurality of electronic content recommendations for a first user using a first plurality of methods, each of the first plurality of methods having a weight assigned based on a type of user device associated with the first user;
assign initial scores to the first plurality of content recommendations;
calculate determined scores for each of the first plurality of content recommendations by multiplying initial scores assigned to a content recommendation by weights associated with methods among the first plurality of methods that generated the content recommendation;
aggregate the determined scores for each of the first plurality of content recommendations;
select a second plurality of electronic content recommendations among the first plurality of electronic content recommendations based on the aggregated scores, the second plurality including a first subset of content recommendations among the first plurality that were recommended using a method with a highest assigned weight and a second subset of content recommendations among the first plurality that were recommended using a method with a second highest assigned weight, the second subset including a lower number of recommendations than the first subset;
provide the first and second subset of the second plurality of electronic content recommendations to the user device for display to the first user; and
constantly update the weights associated with the first plurality of methods based on the first user's interaction with the first and second subset of the second plurality of electronic content recommendations, the first user's interaction received as input to the user device,
wherein to update the weights includes to increase weights associated with methods among the first plurality of methods that recommended recommendations among the second plurality of electronic content recommendations interacted with by the first user, and wherein to increase weights includes to increase weights associated with methods that recommended recommendations interacted with by the first user by $0.1/(n)$, n being a number of recommenders that recommended each recommendation interacted with by the first user.

13. The system of claim 12, wherein the at least one hardware processor is further configured to:
generate a third plurality of electronic content recommendations for a second user using a second plurality of methods, each of the second plurality of methods having a weight associated therewith;
select a fourth plurality of electronic content recommendations among the third plurality of electronic content recommendations based on the weights associated with the second plurality of methods by:
identifying a first method among the third plurality of methods with a highest weight and selecting a third subset of electronic content recommendations generated using the first method; and
identifying a second method among the third plurality of methods with a second highest weight and selecting a fourth subset of electronic content recommendations generated using the second method, the third subset of electronic content recommendations generated using the first method including a greater number of electronic content recommendations than the fourth subset of electronic content recommendations generated using the second method;

provide the third and fourth subset of the fourth plurality of electronic content recommendations to a second user device for display to the second user; and update the second weights based on the second user's interaction with the third and fourth subset of the fourth plurality of electronic content recommendations, the second user's interaction received as input to the second user device.

14. The system of claim 13, wherein the first plurality of methods are different from the second plurality of methods.

15. The system of claim 13, wherein the at least one hardware processor is configured to execute the first plurality of methods in parallel with the second plurality of methods.

16. The system of claim 10, wherein:
the first plurality of electronic content recommendations includes a first electronic recommendation; and
the first method generates the first electronic recommendation by using electronic content from a social network of the first user.

17. The system of claim 10, wherein:
the first plurality of electronic content recommendations includes a first electronic recommendation;
the first method generates the first electronic recommendation; and
the first method includes determining users similar to the first user and determining content read by the users similar to the first user.

18. The system of claim 17, wherein the users similar to the first user are determined based on electronic content shared by the first user and the users similar to the first user.

19. The system of claim 17, wherein the users similar to the first user are determined based on demographic information of the first user and the users similar to the first user.

20. The system of claim 12, wherein the first user's interaction with the second plurality of electronic content recommendations includes at least one of clicking, sharing, and providing to an online message service, an electronic content recommendation in the second plurality of electronic content recommendations.

21. The system of claim 12, wherein the first plurality of electronic content recommendations include at least one of an electronic recommendation for an advertisement, a video file, a text file, and an audio file.

22. A non-transitory computer-readable storage medium storing instructions for enabling a processor to execute a method for providing electronic content recommendations to a plurality of users, the method comprising:

generating a first plurality of electronic content recommendations for a first user using a first plurality of methods, each of the first plurality of methods having a weight assigned based on a type of user device associated with the first user;

assigning initial scores to the first plurality of content recommendations;

calculating determined scores for each of the first plurality of content recommendations by multiplying initial scores assigned to a content recommendation by weights associated with methods among the first plurality of methods that generated the content recommendation;

aggregating the determined scores for each of the first plurality of content recommendations;

selecting a second plurality of electronic content recommendations among the first plurality of content recommendations based on the aggregated scores, the second plurality including a first subset of content recommendations among the first plurality that were recommended using a method with a highest assigned weight and a second subset of content recommendations among the first plurality that were recommended using a method with a second highest assigned weight, the second subset including a lower number of recommendations than the first subset;

providing the first and second subset of the second plurality of electronic content recommendations to the user device for display to the first user; and constantly updating the weights associated with the first plurality of methods based on the first user's interaction with the first and second subset of the second plurality of electronic content recommendations, the first user's interaction received as input to the user device, wherein updating the weights includes increasing weights associated with methods among the first plurality of methods that recommended recommendations among the second plurality of electronic content recommendations interacted with by the first user, and wherein increasing weights includes increasing weights associated with methods that recommended recommendations interacted with by the first user by $0.1/(n)$, n being a number of recommenders that recommended each recommendation interacted with by the first user.

23. The non-transitory computer-readable storage medium of claim 22, wherein the method further comprises:

generating a third plurality of electronic content recommendations for a second user using a second plurality of methods, each of the second plurality of methods having a weight associated therewith;

selecting a fourth plurality of electronic content recommendations among the third plurality of electronic content recommendations based on the weights associated with the second plurality of methods;

providing a third and fourth subset of the fourth plurality of electronic content recommendations to a user device for display to the second user; and updating the weights associated with the second plurality of methods based on the second user's interaction with the third and fourth subset of the fourth plurality of electronic content recommendations, the second user's interaction received as input to the second user device.

24. The non-transitory computer-readable storage medium of claim 23, wherein the first plurality of methods are different from the second plurality of methods.

25. The non-transitory computer-readable storage medium of claim 23, wherein the first plurality of methods are executed in parallel with the second plurality of methods.

26. The non-transitory computer-readable storage medium of claim 22, wherein:
the first plurality of electronic content recommendations includes a first electronic recommendation; and
the first method generates the first electronic recommendation by using electronic content from a social network of the first user.

27. The non-transitory computer-readable storage medium of claim 22, wherein:

the first plurality of electronic content recommendations includes a first electronic recommendation;

the first method generates the first electronic recommendation; and the first method includes determining users similar to the first user and determining electronic content read by the users similar to the first user.

28. The non-transitory computer-readable storage medium of claim 27, wherein the users similar to the first user are determined based on electronic content shared by the first user and the users similar to the first user.

29. The non-transitory computer-readable storage medium of claim 27, wherein the users similar to the first user are determined based on demographic information of the first user and the users similar to the first user.

30. The non-transitory computer-readable storage medium of claim 22, wherein the first user's interaction with the second plurality of electronic content recommendations includes at least one of clicking, sharing, and providing to an online message service, an electronic content recommendation in the second plurality of electronic content recommendations.

31. The non-transitory computer-readable storage medium of claim 22, wherein the first plurality of electronic content recommendations include at least one of an electronic recommendation for an advertisement, a video file, a text file, and an audio file.

* * * * *